United States Patent
Kim et al.

(10) Patent No.: US 9,755,285 B2
(45) Date of Patent: Sep. 5, 2017

(54) FRAME FOR SECONDARY BATTERY AND BATTERY MODULE COMPRISING THE SAME

(71) Applicant: LG CHEM, LTD., Seoul (KR)

(72) Inventors: Ki-Youn Kim, Daejeon (KR);
Jun-Yeob Seong, Daejeon (KR);
Young-Sop Eom, Daejeon (KR);
Sung-Chun Yu, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/031,809

(22) PCT Filed: Oct. 29, 2014

(86) PCT No.: PCT/KR2014/010251
§ 371 (c)(1),
(2) Date: Apr. 25, 2016

(87) PCT Pub. No.: WO2015/065043
PCT Pub. Date: May 7, 2015

(65) Prior Publication Data
US 2016/0248135 A1  Aug. 25, 2016

(30) Foreign Application Priority Data

Oct. 30, 2013 (KR) .......................... 10-2013-0129860
Oct. 13, 2014 (KR) .......................... 10-2014-0137614

(51) Int. Cl.
*H01M 10/6557* (2014.01)
*H01M 2/10* (2006.01)
(Continued)

(52) U.S. Cl.
CPC ..... *H01M 10/6557* (2015.04); *H01M 2/1016* (2013.01); *H01M 2/1061* (2013.01);
(Continued)

(58) Field of Classification Search
CPC .......................... H01M 10/613; H01M 10/647
See application file for complete search history.

(56) References Cited

U.S. PATENT DOCUMENTS

2007/0172722 A1* 7/2007 Nishide ................ H01M 2/021
429/53
2008/0187820 A1   8/2008 Nakano et al.
(Continued)

FOREIGN PATENT DOCUMENTS

KR   10-0870846 B1   11/2008
KR   20-1106111 B1    1/2012
(Continued)

OTHER PUBLICATIONS

International Search Report, issued in PCT/KR2014/010251, PCT/ISA/210, mailed Mar. 11, 2015.
(Continued)

*Primary Examiner* — Olatunji Godo
(74) *Attorney, Agent, or Firm* — Birch, Stewart, Kolasch & Birch, LLP (57) ABSTRACT

In the present disclosure, disclosed are a frame for secondary batteries, which prevents gas from flowing into a cooling channel or a duct connected to it, when such gas is generated from secondary batteries; and a battery module comprising the same. A frame for secondary batteries according to the present disclosure comprises: an upper cooling plate which is plate-shaped and made of thermally conductive material; a lower cooling plate which is plate-shaped and made of thermally conductive material and is placed spaced apart from the upper cooling plate by a predetermined distance to face the upper cooling plate so that a channel is formed in a space between the upper cooling plate and the lower cooling plate; and a main frame which comprises four unit frames with both ends being connected to each other, encompasses the outer peripheral portions of the upper (Continued)

cooling plate and the lower cooling plate, allows an outer peripheral portion of a pouch-type secondary battery to be mounted thereon, comprises openings formed in the side surfaces of two of the unit frames for the channel to be opened, and has uneven parts, corresponding to each other, respectively formed on upper and lower portions of at least two of the unit frames.

18 Claims, 4 Drawing Sheets

(51) Int. Cl.
| | | |
|---|---|---|
| *H01M 10/04* | (2006.01) | |
| *H01M 10/647* | (2014.01) | |
| *H01M 10/613* | (2014.01) | |
| *H01M 10/6554* | (2014.01) | |
| *H01M 10/625* | (2014.01) | |

(52) U.S. Cl.
CPC ..... *H01M 2/1077* (2013.01); *H01M 10/0486* (2013.01); *H01M 10/613* (2015.04); *H01M 10/625* (2015.04); *H01M 10/647* (2015.04); *H01M 10/6554* (2015.04); *H01M 2/1094* (2013.01); *H01M 2220/20* (2013.01)

(56) References Cited

U.S. PATENT DOCUMENTS

| | | | | |
|---|---|---|---|---|
| 2009/0208827 A1* | 8/2009 | Kondo | ................... | B25F 5/02 |
| | | | | 429/98 |
| 2011/0293982 A1* | 12/2011 | Martz | ................ | H01M 10/613 |
| | | | | 429/120 |
| 2012/0040222 A1* | 2/2012 | Quick | ................ | H01M 10/647 |
| | | | | 429/120 |
| 2012/0040223 A1 | 2/2012 | Odumodu | | |
| 2013/0177790 A1* | 7/2013 | Yang | .................. | B60L 11/1879 |
| | | | | 429/72 |
| 2014/0242429 A1 | 8/2014 | Lee et al. | | |

FOREIGN PATENT DOCUMENTS

| | | | |
|---|---|---|---|
| WO | WO 2011065674 | * | 6/2011 |
| WO | WO 2013/111960 A1 | | 8/2013 |

OTHER PUBLICATIONS

Written Opinion of the International Searching Authority, issued in PCT/KR2014/010251, PCT/ISA/237, mailed Mar. 11, 2015.

* cited by examiner

FRAME FOR SECONDARY BATTERY AND BATTERY MODULE COMPRISING THE SAME

TECHNICAL FIELD

The present application claims the benefit of Korean Patent Application No. 10-2013-0129860 filed on Oct. 30, 2013 and No. 10-2014-0137614 filed on Oct. 13, 2014 with the Korean Intellectual Property Office, the disclosure of which is incorporated herein by reference in its entirety.

The present disclosure relates to a battery, and more particularly to a frame for secondary batteries, which is used in manufacturing a battery module comprising a plurality of secondary batteries, and a battery module comprising the same.

BACKGROUND ART

Currently, commercially available secondary batteries include nickel cadmium, nickel hydrogen, nickel zinc and lithium secondary batteries. Among them, lithium secondary batteries have drawn much attention because of little memory effect to allow unrestrained charging/discharging, as well as very low self-discharging rate and high energy density, compared to nickel-based secondary batteries.

For such secondary batteries, lithium-based oxides and carbon materials are mainly used respectively as positive electrode active materials and negative electrode active materials. A lithium secondary battery includes an electrode assembly, which consists of a positive plate and a negative plate, with a separator therebetween, to which such positive electrode and negative electrode active materials are applied respectively, and an exterior material, i.e. a battery case, which stores and seals the electrode assembly along with an electrolyte.

Generally, lithium secondary batteries can be classified into a can-type secondary battery which integrates an electrode assembly into a metal can, and a pouch-type secondary battery which integrates an electrode assembly into a pouch made of an aluminum laminate sheet.

Recently, secondary batteries are widely used in middle- or large-sized devices like vehicles and power storage devices as well as small-sized devices like portable electronic appliance. When used in such middle- or large-sized devices, a plurality of secondary batteries are electrically connected in large numbers to increase the capacity and output. Especially, in such middle- or large-sized devices, pouch-type secondary batteries are usually employed because they can easily be stacked.

However, pouch-type secondary batteries are typically packaged in a battery case made of an aluminum/polymer resin laminate sheet, thus exhibiting insufficient mechanical rigidity. Therefore, when manufacturing a battery module with a plurality of pouch-type secondary batteries, frames are often employed to protect such secondary batteries from external shock, inhibit the movement thereof, and allow easy lamination.

Frames can be substituted for by other various terms such as cartridge, and are usually arranged in the shape of a rectangular plate with the center being empty, with the four sides encompassing the outer peripheral portions of pouch-type secondary batteries. In order to manufacture a battery module, a plurality of such frames are stacked and secondary batteries can be placed in inner empty spaces formed thereby.

On the other hand, when assembling a plurality of secondary batteries using such a plurality of frames, a plate-shaped cooling pin can be interposed between secondary batteries. Secondary batteries may be used in high-temperature environment such as in summer, and may generate heat on their own. In this case, when a plurality of secondary batteries are stacked on each other, the temperature of secondary batteries can be increased higher; and if the temperature becomes higher than suitable levels, the performance of secondary batteries may be deteriorated, even with the risk of explosion or fire in worse cases. Therefore, when manufacturing a battery module, a cooling pin is usually interposed between secondary batteries to prevent a rise in the temperature of secondary batteries.

Such a cooling pin is plate-shaped to be called a cooling plate, which is placed between secondary batteries in a battery module to cool secondary batteries in various forms and manners. Among such forms and manners to cool secondary batteries, air-cooling is typically and widely used to lower the temperature of secondary batteries via heat exchange between a cooling plate and air by allowing external air to flow around the cooling plate. For a battery module which cools secondary batteries using such air cooling, arranged is a cooling channel around cooling plates, which is connected to a duct to allow air to go into and out of the battery module.

However, for a battery module with such arrangements, gas generated from secondary batteries may be discharged to the outside via a cooling channel and a duct, causing some problems. In other words, gas likely to contain harmful substances may be generated while using pouch-type secondary batteries. If such harmful gas generated from secondary batteries infiltrates into a cooling channel, it may be discharged to the outside via a duct and then be inhaled into a user for such secondary batteries. Especially, hybrid cars and electric cars are equipped with middle- or large-sized battery pack including secondary batteries in large numbers, and they are thus more likely to discharge harmful gases generated from such secondary batteries. Also, if such harmful gas is discharged from a battery pack and flown into a duct, a driver inhaling the discharged gas may not only be exposed to direct bodily danger but also be more liable to traffic accidents because his or her driving ability is compromised during driving.

DISCLOSURE

Technical Problem

The present disclosure is designed to solve the problems of the related art, and therefore the present disclosure is directed to providing: a frame for secondary batteries, which prevents gas from flowing into a cooling channel or a duct connected to it, when such gas is generated from secondary batteries; and a battery module, a battery pack and a vehicle comprising the same.

The other objectives and advantages of the present disclosure can be understood with the following description and more clearly with the embodiments of the present disclosure. Also, it should easily be understood that the other objectives and advantages of the present disclosure can be implemented by the means described in the claims and the combinations thereof.

Technical Solution

In one aspect of the present disclosure, there is provided a frame for secondary batteries according to the present disclosure comprising: an upper cooling plate which is plate-shaped and made of thermally conductive material; a lower cooling plate which is plate-shaped and made of thermally conductive material and is arranged to be spaced apart from the upper cooling plate by a predetermined distance to face the upper cooling plate, so that a channel is formed in a space between the upper cooling plate and the lower cooling plate; and a main frame which comprises four unit frames with both ends being connected to each other, encompasses the outer peripheral portions of the upper cooling plate and the lower cooling plate, allows an outer peripheral portion of a pouch-type secondary battery to be mounted thereon, comprises openings formed in the side surfaces of two of the unit frames for the channel to be opened, and has uneven parts, corresponding to each other, respectively formed on upper and lower portions of at least two of the unit frames.

Preferably, the uneven parts are arranged to couple mutually with uneven parts of adjacent frames for secondary batteries and to seal the coupled portions, when the frames are stacked vertically.

Also preferably, the uneven parts are formed, at least, on the unit frames in which the openings are formed.

Also preferably, the uneven parts are formed to elongate in the longitudinal direction of the unit frames.

Also preferably, two or more of the uneven parts are formed respectively on upper portions and lower portions of the unit frames.

Also preferably, the uneven parts comprise both convex parts and concave parts respectively formed at upper portions and lower portions of the unit frames.

Also preferably, the main frame comprises mounting parts formed on upper portions of the unit frames on which the uneven parts are formed, to allow a sealing portion of the pouch-type secondary battery to be bent and mounted thereon.

Also preferably, the main frame has sealing members on the uneven parts.

Also preferably, a venting channel through which gas leaked from the pouch-type secondary battery flows can be physically separated from the channel between the upper cooling plate and the lower cooling plate, when the frames for secondary batteries are stacked vertically.

Also preferably, the main frame comprises a venting part, on the side surface of the unit frame in which no opening is formed, to open the space storing the pouch-type secondary batteries.

Also preferably, the main frame is arranged to mount one pouch-type secondary battery on an upper portion of the upper cooling plate, and another pouch-type secondary battery on a lower portion of the lower cooling plate.

In order to achieve the foregoing objectives, a battery module according to the present disclosure comprises a frame for secondary batteries according to the present disclosure.

In order to achieve the foregoing objectives, a battery pack according to the present disclosure comprises a frame for secondary batteries according to the present disclosure.

In order to achieve the foregoing objectives, a vehicle according to the present disclosure comprises a frame for secondary batteries according to the present disclosure.

Advantageous Effects

The present disclosure gives the following effects. According to one aspect of the present disclosure, it is possible to provide more reliable physical separation between a cooling channel along which a cooling fluid flows to exchange heat with a cooling plate and a space storing secondary batteries.

Such aspect of the present disclosure thus effectively prevents gas from flowing into a cooling channel when such gas is generated from secondary batteries.

Particularly, according to one aspect of the present disclosure, when frames for secondary batteries are stacked vertically, convex parts formed at upper and/or lower portions of the frame are inserted and coupled with concave parts formed at lower and/or upper portions of the frame, thereby complicating a path along which gas may be leaked from a space storing secondary batteries into a cooling channel.

Therefore, according to the present disclosure, harmful gas can be prevented from flowing via a cooling channel and a duct to a user for the battery pack, when such gas may be generated therefrom.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Mode for Disclosure

A frame for secondary batteries according to the present disclosure is used to manufacture a battery module by laminating and packaging a plurality of secondary batteries, and can hold secondary batteries to be prevented from moving and guide the assembling of secondary batteries.

Figure 1:
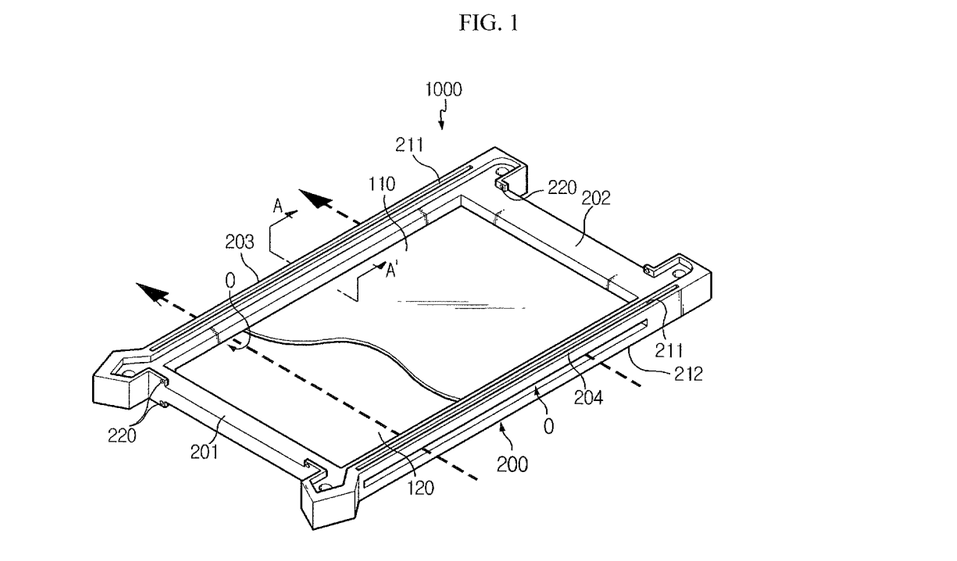
FIG. 1 is a schematic perspective view of an arrangement of a frame for secondary batteries according to one embodiment of the present disclosure.
Figure 2:
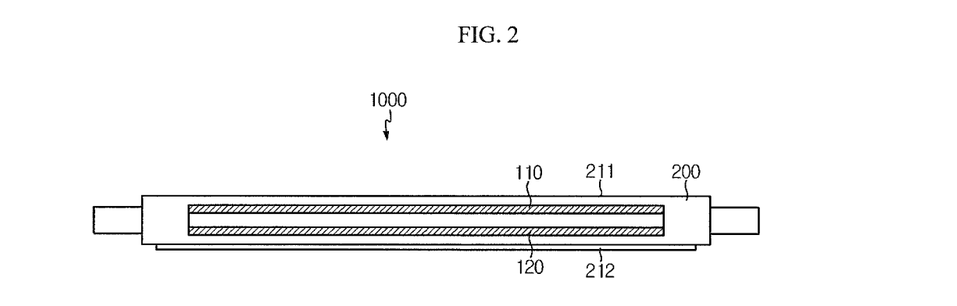
FIG. 2 is a right side view of the arrangement of FIG. 1.
Figure 3:
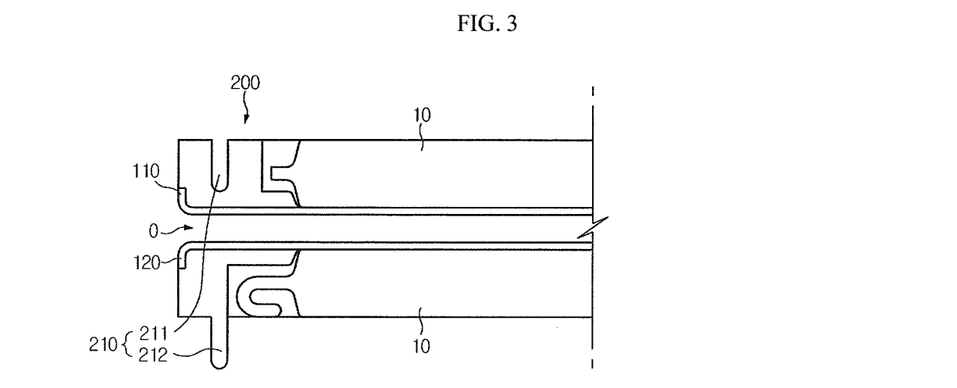
FIG. 3 is a cross-sectional view of FIG. 1 with respect to A-A' line.

FIG. 1 is a schematic perspective view of the arrangement of a frame 1000 for secondary batteries according to one embodiment of the present disclosure. FIG. 2 is a right side view of the arrangement of FIG. 1. Also, FIG. 3 is a cross-sectional view of FIG. 1 with respect to A-A' line. Just for convenience of description, some portion of an upper cooling plate 110 is shown to be cut off in FIG. 1.

Referring to FIG. 1 to FIG. 3, a frame for secondary batteries 1000 according to the present disclosure comprises an upper cooling plate 110, a lower cooling plate 120 and a main frame 200.

An upper cooling plate 110 is configured to a large plate form and arranged to lie for the larger surface thereof to face up and down. Particularly, an upper cooling plate 110 can be configured to a rectangular plate form.

A lower cooling plate 120 is configured to a large plate form like the upper cooling plate 110, and can be formed in a shape to correspond to the shape of the upper cooling plate 110, for example, the same shape as that of the upper cooling plate 110. Particularly, a lower cooling plate 120 can be arranged below an upper cooling plate 110, so that the larger surface of the former can be faced mutually with the larger surface of the latter. Here, the lower cooling plate 120 can be arranged to be spaced apart by a predetermined distance from the upper cooling plate 110. Furthermore, a lower cooling plate 120 can be arranged to be parallel in the horizontal direction to an upper cooling plate 110.

As described above, a lower cooling plate 120 is arranged to be away more or less from an upper cooling plate 110, and an empty space between a lower cooling plate 120 and an upper cooling plate 110 is formed thereby. A cooling fluid can flow through an empty space formed thereby, which means that an empty space between a lower cooling plate 120 and an upper cooling plate 110 can function as a channel. In other words, a cooling channel can be formed in a space between the lower cooling plate 120 and the upper cooling plate 110.

The upper cooling plate 110 and the lower cooling plate 120 can respectively be made of thermally conductive material allowing heat exchange with secondary batteries 10 placed above and below. Particularly, such two cooling plates (upper and lower cooling plates) can be made of aluminum material which are highly thermally conductive, easy to mold and lightweight. However, the present disclosure is not limited to cooling plates with the above-mentioned materials, and they can be made of various materials such as metals other than aluminum.

The main frame 200 can comprise four unit frames, with both ends being connected to each other. In other words, as shown in FIG. 1, the main frame 200 can comprise four sides, and form a rectangular ring with the center being empty when viewed downward from the above. Here, each unit frame in a main frame 200 can be regarded to constitute each side of a rectangle.

The main frame 200 can be configured to encompass the outer peripheral portions of an upper cooling plate 110 and a lower cooling plate 120 by such four unit frames. For example, the main frame 200 comprises unit frames respectively on front, rear, left and right sides, and each of the unit frames can be configured to encompass the front, rear, left and right outer portions of an upper cooling plate 110 and a lower cooling plate 120. And, in an empty space in a main frame 200, an upper cooling plate 110 can be exposed upward, and a lower cooling plate 120 can be exposed downward.

The main frame 200 can be manufactured by injection molding and the like, with an upper cooling plate 110 and a lower cooling plate 120 being interposed; however, the present disclosure is not limited to such manufacturing methods.

The main frame 200 can be configured to mount pouch-type secondary batteries 10. Particularly, the main frame 200 can be configured to mount the outer peripheral portions of pouch-type secondary batteries 10. For example, pouch-type secondary batteries 10 can be configured to be broadly rectangle-shaped when viewed downward from the above; here, the front, rear, left and right peripheral portions of pouch-type secondary batteries 10 can be mounted respectively on the front, rear, left and right unit frames 204 of a main frame 200.

Here, pouch-type secondary batteries 10 whose outer peripheral portions consist of four sides can be configured for all or some (for example, front and rear sides) of the four sides to be mounted on a main frame 200.

Preferably, two pouch-type secondary batteries 10 can be mounted on the main frame 200. In other words, as shown in FIG. 3, an upper cooling plate 110 and a lower cooling plate 120 can be arranged vertically in a central portion of the main frame 200; two pouch-type secondary batteries 10 can be arranged respectively on an upper portion of an upper cooling plate 110 and on a lower portion of a lower cooling plate 120.

Two or more of main frames 200 with the above configurations can be configured to be stacked, and two or more of frames for secondary batteries can be stacked thereby. In other words, in the arrangement of a main frame 200 in FIG. 3, different main frames 200 can be stacked respectively above and below. When two or more of frames for secondary batteries are stacked in such manners, main frames 200 are arranged on an outer peripheral portion and cooling plates are arranged on an upper portion or a lower portion, with respect to secondary batteries 10. Therefore, when two or more of frames for secondary batteries are stacked vertically, two secondary batteries 10 can be stored in each frame for secondary batteries.

The main frame 200 can comprise openings in the side surfaces, as indicated as O in FIG. 1 to FIG. 3. Here, openings are configured to penetrate through a main frame 200 in the horizontal direction, and at least a portion of a channel (i.e. an empty space formed between an upper cooling plate 110 and a lower cooling plate 120) can be configured to be exposed outward and opened. Therefore, air external to a main frame 200 can go into and out of a channel formed between two cooling plates via such openings.

Particularly, the openings can be formed in the side surfaces of two of four unit frames. Here, an opening formed in the side surface of one unit frame can function as an inlet of a fluid, and an opening formed in the side surface of the other unit frame can function as an outlet of a fluid. For example, when a main frame 200 comprises a front unit frame 201, a rear unit frame 202, a left unit frame 203, and a right unit frame 204, as shown in FIG. 1, openings can be formed respectively in the left unit frame 203 and the right unit frame 204. Here, an opening formed in the side surface of a right unit frame 204 can function as an inlet of a fluid, and an opening formed in the left frame can function as an outlet of a fluid. Therefore, as shown by a dotted arrow in FIG. 1, external air flown into the opening of a right unit frame 204 flows along a channel between two cooling plates while performing heat exchange with secondary batteries 10 via cooling plates. Air which has performed heat exchange with cooling plates can be discharged from a main frame 200 to the outside via the opening of a left unit frame 203.

On the other hand, when openings are formed in the side surface of two unit frames, it is preferable to form the openings respectively in unit frames which are placed to be opposite to each other. For example, like the above embodiments, openings can be formed respectively in a left unit frame 203 and a right unit frame 204. According to such embodiments, the inlet and the outlet of a channel are formed on opposite sides, so that the channel along which a fluid flows can be linear. Therefore, such arrangements allow a fluid to go into and out of a main frame smoothly and quickly, and enhance cooling efficiency by flowing a fluid across the whole section of a channel formed between cooling plates.

Also, the main frame 200 can comprise uneven parts 210 to correspond to each other, respectively formed on upper portions of two or more unit frames and on lower portions thereof. Here, uneven parts 210 can comprise convex parts 212 formed to be protruded vertically and concave parts 211 to be recessed vertically. Therefore, the main frame 200 can either comprise a convex part 212 formed at an upper portion and a concave part 211, corresponding to the convex part 212, formed at a lower portion, or comprise a convex part 212 formed at a lower portion and a concave part 211, corresponding to the convex part 212, formed at an upper portion.

For example, as shown in FIG. 1, the main frame 200 comprises a left unit frame 203 and a right unit frame 204, which can comprise uneven parts 210 formed on upper portions and lower portions. Here, uneven parts 210 can comprise, for example, as shown in FIG. 3, a convex part 212 formed at a lower portion of a unit frame, and a concave part 211, corresponding to the convex part 212, formed at an upper portion of a unit frame. In addition to such arrangements, uneven parts 210 may also comprise a convex part 212 formed at an upper portion of a unit frame, and a concave part 211 formed at a lower portion of a unit frame.

Figure 4:
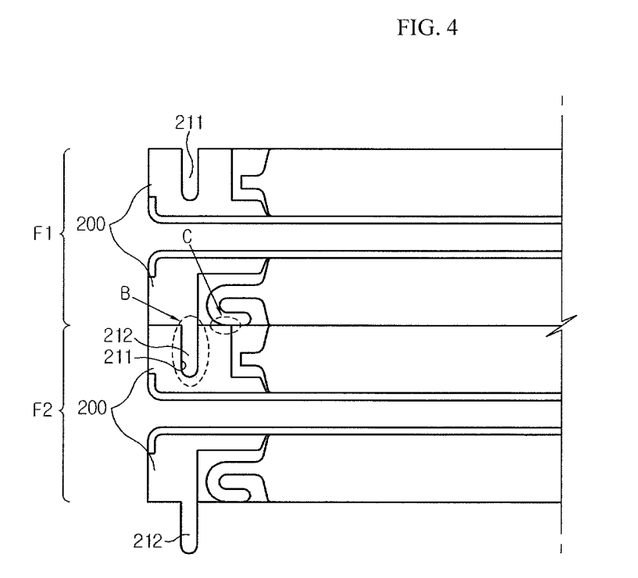
FIG. 4 is a schematic cross-sectional view of frames for secondary batteries stacked vertically according to one embodiment of the present disclosure.

FIG. 4 is a schematic cross-sectional view of frames for secondary batteries stacked vertically according to one embodiment of the present disclosure. Particularly, FIG. 4 is an arrangement in which two frames for secondary batteries shown in FIG. 3 are stacked, and the frames for secondary batteries placed above and below are respectively called F1 and F2.

Referring to FIG. 4, two frames for secondary batteries stacked vertically, F1 and F2, can respectively comprise convex parts 212 formed at a lower portion of the unit frame, and concave parts 211, corresponding to the convex parts 212, formed at an upper portion of the corresponding unit frame. Therefore, when such unit frames F1 and F2 are stacked vertically (up and down), uneven parts 210 are coupled with each other, so that a convex part 212 of F1 are inserted into a concave part 211 of F2.

Preferably, uneven parts 210 are configured to couple mutually with uneven parts 210 of adjacent frames for secondary batteries and to seal the coupled portions, when the frames are stacked vertically.

For example, in the embodiment in FIG. 4, when F1 and F2 are stacked vertically and subsequently a convex part 212 of F1 and a concave part 211 of F2 are mutually coupled with each other, such a coupled portion (indicated as B) can be an impediment to a path along which a gas flows into a space between F1 and F2 stacked. Therefore, gas can be prevented completely or at least significantly from flowing through a space between such frames for secondary batteries.

In FIG. 4, particularly, a duct may be arranged on a left portion of a main frame 200 to supply external air to a channel formed between cooling plates or to discharge air flowing along the channel outward from a battery module. In the present disclosure, however, since uneven parts 210 are formed in a space between main frames 200 stacked to mutually couple the frames 200, a fluid can effectively be prevented completely or partially from flowing into the space between two main frames 200 stacked. In FIG. 4, therefore, when gas is generated from pouch-type secondary batteries 10 placed at a right portion of main frames 200, such gas can be prevented completely or partially from flowing into a duct placed at a left portion via a space between main frames 200.

On the other hand, as shown in FIG. 3 and FIG. 4, upper cooling plates 110 and lower cooling plates 120 are preferably formed to elongate enough to penetrate through a unit frame, i.e. a main frame 200. According to such embodiments, gas generated from pouch-type secondary batteries 10 can be prevented from leaking into a space either between an upper cooling plate 110 and a unit frame or between a lower cooling plate 120 and a unit frame, and subsequently flowing into a channel or a duct.

Also preferably, the uneven parts 210 can be formed, at least, on the unit frames in which the openings are formed.

For example, as shown in FIG. 1, when openings are formed in a left unit frame 203 and a right unit frame 204 to open a channel, uneven parts 210 can be formed on the left unit frame 203 and the right unit frame 204. When gas is generated from secondary batteries 10, it is preferable to prevent such gas from flowing into a duct. Since a duct may be arranged on an outer portion of unit frames in which openings are formed, uneven parts 210 can be formed on such unit frames, shown in the embodiments, to effectively prevent gas from flowing from secondary batteries 10 to the duct by the coupling of the uneven parts 210 when frames for secondary batteries are stacked.

Also preferably, the uneven parts 210 can be formed to elongate in the longitudinal direction of the unit frames. According to such embodiments of the present disclosure, gas can effectively be prevented from going into and out of unit frames on which uneven parts 210 are formed.

For example, as shown in FIG. 1 and FIG. 2, when uneven parts 210 are formed on a left unit frame 203 and a right unit frame 204, the uneven parts 210 can be formed to elongate in the longitudinal direction from the front ends to the rear ends of the left unit frame 203 and the right unit frame 204. According to such arrangements in the present disclosure, gas can be prevented from going into and out of any portion of a left unit frame 203 and a right unit frame 204.

Particularly, the uneven parts 210 can be formed to extend from one end to the other end of the unit frames in which openings are formed. According to such configurations, therefore, gas can be prevented from going into and out of the whole portion of unit frames in which openings are formed, so that gas generated from secondary batteries 10 can be prevented from flowing into a duct arranged at an outer portion of unit frames in which openings are formed.

Also preferably, two or more of uneven parts 210 can be formed respectively on upper portions and lower portions of the unit frames. Such arrangements will be described in detail referring to FIG. 5.

Figure 5:
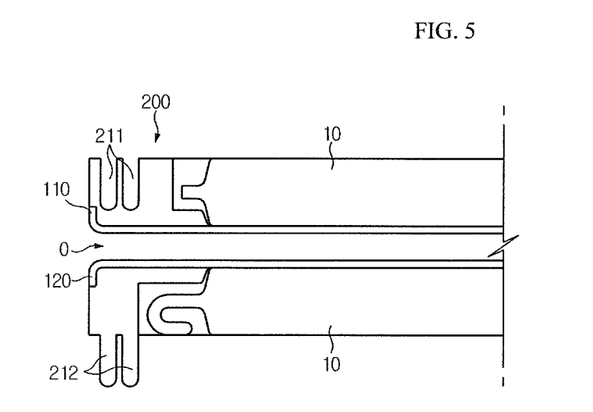
FIG. 5 is a cross-sectional view of an arrangement of uneven parts of a frame for secondary batteries according to another embodiment of the present disclosure.

FIG. 5 is a cross-sectional view illustrating a configuration of the uneven parts 210 of a frame for secondary batteries according to another embodiment of the present disclosure. FIG. 5 is, like FIG. 3, a cross-sectional view with respect to A-A' line in FIG. 1, but illustrates another configuration of uneven parts 210.

Referring to FIG. 5, two uneven parts 210 can be formed respectively in upper portions of unit frames and in lower portions thereof. For example, as shown in FIG. 5, two concave parts 211 are formed at upper portions of unit frames and two convex parts 212 are formed at lower portions of unit frames.

Particularly, when two or more uneven parts 210 are formed respectively in upper portions and lower portions of unit frames, uneven parts 210 can be arranged in the direction perpendicular to the longitudinal direction of the unit frames. In FIG. 5, for example, two concave parts 211 formed at upper portions of a unit frame can be arranged leftward and rightward in the direction perpendicular to the longitudinal direction of the unit frame. Also, corresponding to such an arrangement of concave parts 211, two convex parts 212 formed at lower portions of a unit frame can be arranged leftward and rightward.

According to such arrangements in the present disclosure, when two frames for secondary batteries are stacked vertically, gas can be prevented more effectively from flowing into a space formed between the frames stacked. In other words, when two frames for secondary batteries shown in FIG. 5 are stacked, two uneven parts 210 exist in a space between the frames stacked to complicate furthermore a path along which gas can be leaked. Therefore, gas can thereby be prevented more effectively from flowing into a space between frames for secondary batteries being stacked.

On the other hand, like the above embodiments, when two or more uneven parts 210 are respectively formed in upper portions and lower portions of unit frames, it is not necessary to form uneven parts 210 having identical shapes on identical portions of unit frames. In other words, while FIG. 5 illustrates two concave parts 211 and two convex parts 212 respectively formed at upper portions and lower portions of unit frames, uneven parts 210 can be configured in various shapes.

Figure 6:
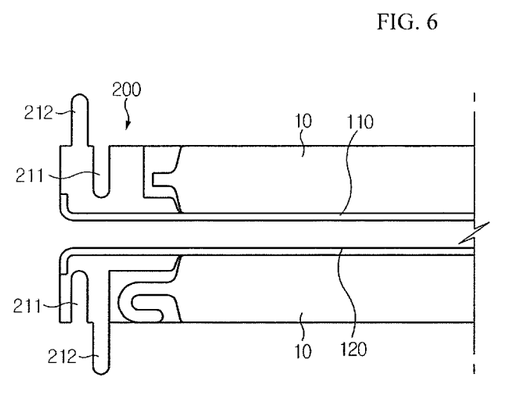
FIG. 6 is a cross-sectional view of an arrangement of uneven parts of a frame for secondary batteries according to still another embodiment of the present disclosure.

FIG. 6 is a cross-sectional view of an arrangement of uneven parts 210 of a frame for secondary batteries according to still another embodiment of the present disclosure. FIG. 6 is a different embodiment modified from the arrangements in FIG. 3 and FIG. 5.

Referring to FIG. 6, both concave parts 211 and convex parts 212 are formed respectively at upper portions and lower portions of unit frames. In other words, unit frames can be configured to comprise both concave parts 211 and convex parts 212 formed, both at upper portions and lower portions. According to such arrangements in the present disclosure, it is possible to complicate a path along which gas flows into a space between main frames 200.

Also preferably, the main frames 200 comprise mounting parts formed on upper portions of unit frames on which uneven parts 210 are formed, to allow a sealing portion of the pouch-type secondary battery 10 to be bent and mounted thereon. In other words, like a portion indicated by C in the configuration in FIG. 4, it is preferable for unit frames on which uneven parts 210 are formed, in a main frame 200, to comprise, on upper portions, mounting parts to allow a sealing portion of the secondary battery 10 to be bent and mounted thereon. According to such configurations in the present disclosure, mounting parts can be in contact with sealing portions of secondary batteries 10 are bended to form a barrier against gas flowing outward. Therefore, when gas is generated from sealing portions of secondary batteries 10, such gas can be prevented completely or partially from flowing outward by such a configuration in which bended portions of the sealing portions are in contact with mounting parts.

Figure 7:
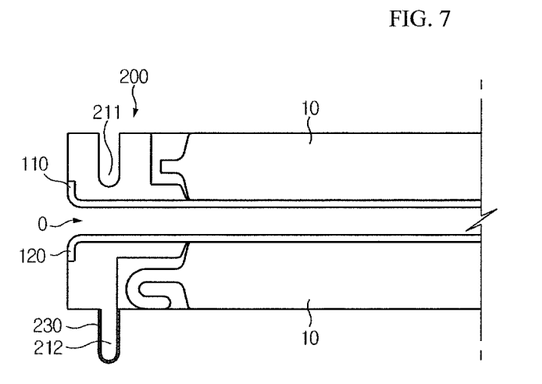
FIG. 7 is a cross-sectional view of an arrangement of uneven parts of a frame for secondary batteries according to still another embodiment of the present disclosure.

FIG. 7 is a cross-sectional view illustrating an arrangement of uneven parts 210 of a frame for secondary batteries according to still another embodiment of the present disclosure.

Referring to FIG. 7, the main frame 200 can comprise sealing members 230 on uneven parts 210. Here, sealing members 230 are components arranged on uneven parts 210 to enhance sealing strength when the uneven parts 210 are coupled with each other. As shown in FIG. 7, the sealing members 230 can be arranged on the surface of protruding parts to be placed within a space in which uneven parts 210 are coupled. Also, the sealing members 230 can be arranged on the surface of concave parts 211 or both on that of protruding parts and on that of concave parts 211.

Such sealing members 230 can be made of rubber material. Rubber material is advantageous in ensuring sealing strength to prevent a fluid from moving through a space between frames. In the present disclosure, however, sealing members 230 are not limited to rubber material, and can be made of various materials to enhance sealing strength.

Also preferably, according to one aspect of the present disclosure, a venting channel is physically separated from a cooling channel. Here, a venting channel is a path along which a gas generated from pouch-type secondary battery flows within a battery module. Also, a cooling channel is a path along which a cooling fluid flows within a battery module. And, that the venting channel is physically separated from the cooling channel means that air flowing in the former is not allowed to go into the latter, or vice versa (that that air flowing in the latter is not allowed to go into the former).

In other words, according to one embodiment of the present disclosure, frames for secondary batteries can be configured to comprise a venting channel along which gas generated from secondary battery flows, so that the venting channel can be physically separated from a cooling channel between upper cooling plates 110 and lower cooling plates 120.

More specifically, it is possible to physically separate a venting channel from a cooling channel by forming them in different layers. For example, for one frame for secondary batteries, a venting channel can be formed on an upper portion of an upper cooling plate 110, and a cooling channel can be formed on a lower portion thereof.

According to such an arrangement in the present disclosure, gas generated from secondary batteries 10 can be prevented from going outward through portions in which openings are formed. Particularly, according to the present disclosure, when harmful gas can may be generated from secondary batteries, such gas can be discharged only outward from a battery pack via a venting channel, not to a user for the battery pack via a cooling channel and a duct.

Also preferably, the main frame 200 can comprise venting part 220 which is formed on the side surface of the unit frame in which no opening is formed, to open the space storing the pouch-type secondary batteries 10. In this case, particularly, the openings can be formed in the left and right side surfaces of a main frame 200, and venting parts 220 can be formed at the front and rear side surfaces of the main frame 200.

For example, as shown in FIG. 1, for a main frame 200, when openings are formed in a left unit frame 203 and a right unit frame 204, venting parts 220 can be formed on a front unit frame 201 and a rear unit frame 202 in which no openings are formed. According to such an arrangement in the present disclosure, when gas is generated from secondary batteries 10 placed at an inner portion of a main frame 200, such gas can be discharged outward from the main frame 200 via venting parts 220 of the main frame 200. Here, venting parts 220 are placed at portions of unit frames in which no openings are formed, so that gas generated from secondary batteries 10 can be prevented from flowing into portions in which openings are formed.

Particularly, in such an arrangement in FIG. 1, while a path along which a cooling fluid flows can be formed leftward and rightward between a left unit frame 203 and a right unit frame 204 along with the channel, a path along which a gas generated from secondary batteries 10 flows can be formed frontward and rearward between a front unit frame 201 and a rear unit frame 202. Here, while a duct for a cooling fluid to go into and out of a battery module can be arranged at an outer portion of a left unit frame 203 and a right unit frame 204, venting devices to discharge gas generated from secondary batteries 10 can be arranged at outer portions of a front unit frame 201 and a rear unit frame 202.

On the other hand, the venting parts 220 can be formed to be hole-shaped or concave, as shown in FIG. 1.

A battery module according to the present disclosure comprises a plurality of the frames, described above, for secondary batteries.

Figure 8:
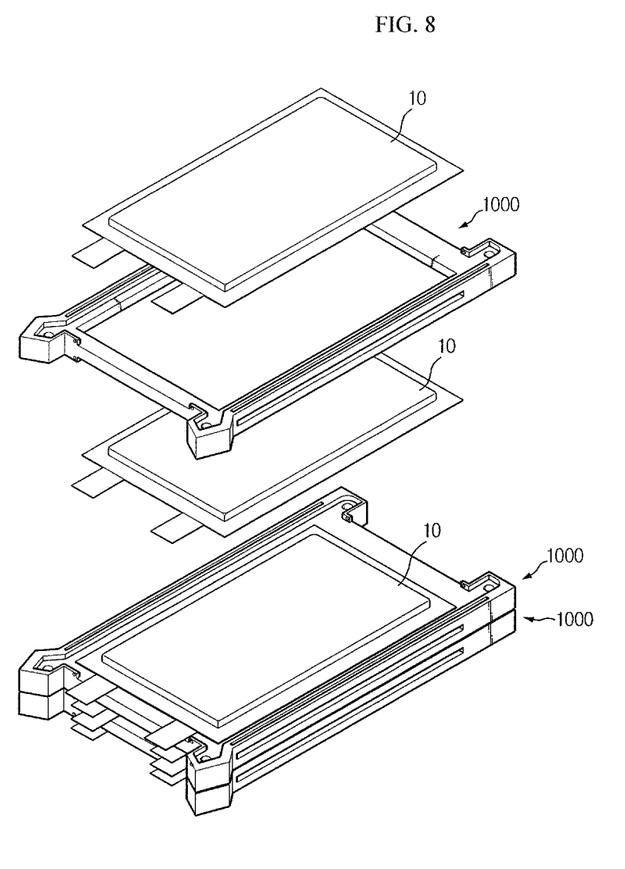
FIG. 8 is a schematic view of an arrangement of a battery module according to one embodiment of the present disclosure.

FIG. 8 is a schematic view of a configuration of a battery module according to one embodiment of the present disclosure.

Referring to FIG. 8, a battery module according to the present disclosure can comprise a plurality of pouch-type secondary batteries 10 along with a plurality of frames for secondary batteries 1000. Here, frames for secondary batteries 1000 can be stacked vertically, and inner spaces formed thereby can store pouch-type secondary batteries 10. Particularly, a battery module according to the present disclosure can be configured to store two pouch-type secondary batteries 10 for each frame for secondary batteries 1000.

A battery pack according to the present disclosure can comprise one or more battery modules according to the present disclosure. And, such battery modules can comprise a plurality of the frames, described above, for secondary batteries according to the present disclosure. Also, a battery pack according to the present disclosure can further comprise, in addition to such battery modules, a case to store the same, and various devices to control charging/discharging thereof, for example, battery management system (BMS), a current sensor, a fuse, and the like.

Frames for secondary batteries according to the present disclosure can be applied to vehicles such as electric cars or hybrid cars. In other words, vehicles according to the present disclosure can comprise a battery pack according to the present disclosure, which can in turn comprise frames for secondary batteries.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Also, while the present specification includes terms to indicate directions, such as upper, lower, above, below, up, down, left, right, front, rear and the like, such terms are just for convenience of description, and it will become apparent to those skilled in the art that such terms may be different depending on the locations of objects and observers.

What is claimed is:

1. A frame for secondary batteries, comprising:
   an upper cooling plate which is plate-shaped and made of thermally conductive material;
   a lower cooling plate which is plate-shaped and made of thermally conductive material and is arranged to be spaced apart from the upper cooling plate by a predetermined distance to face the upper cooling plate so that a channel is formed in a space between the upper cooling plate and the lower cooling plate; and
   a main frame, which comprises four unit frames with both ends being connected to each other, encompasses outer peripheral portions of the upper cooling plate and the lower cooling plate, allows an outer peripheral portion of a pouch-type secondary battery to be mounted thereon, comprises openings formed in side surfaces of two of the unit frames, each opening being in communication with the channel, and has uneven parts, corresponding to each other, respectively formed on upper and lower portions of at least two of the unit frames,
   wherein the uneven parts are formed, at least, on the two unit frames in which the openings are formed,
   wherein the uneven parts include:
     upper uneven parts formed in the upper portions of the two unit frames in which the openings are formed, respectively; and
     lower uneven parts formed in the lower portions of the two unit frames in which the openings are formed, respectively, and
   wherein one of the upper uneven parts and the lower uneven parts of the main frame are configured to be inserted into the other of the upper uneven parts and the lower uneven parts of another main frame when the main frames are stacked together.

2. The frame for secondary batteries of claim 1, wherein the uneven parts are configured to couple mutually with uneven parts of adjacent frames for secondary batteries and to seal the coupled portions, when the frames are stacked vertically.

3. The frame for secondary batteries of claim 1, wherein the uneven parts are formed to elongate in the longitudinal direction of the unit frames.

4. The frame for secondary batteries of claim 3, wherein the uneven parts are formed to extend from one end to the other end of the unit frames in which the openings are formed.

5. The frame for secondary batteries of claim 1, wherein two or more of the uneven parts are formed respectively in upper portions and lower portions of the unit frames.

6. The frame for secondary batteries of claim 5, wherein the two or more uneven parts are arranged in the direction perpendicular to the longitudinal direction of the unit frames.

7. The frame for secondary batteries of claim 1, wherein the uneven parts comprise both convex parts and concave parts formed respectively at upper portions and lower portions of the unit frames.

8. The frame for secondary batteries of claim 1, wherein the main frame comprises mounting parts formed on upper portions of the unit frames on which the uneven parts are formed, to allow a sealing portion of the pouch-type secondary battery to be bent and mounted thereon.

9. A frame for secondary batteries, comprising:
an upper cooling plate which is plate-shaped and made of thermally conductive material;
a lower cooling plate which is plate-shaped and made of thermally conductive material and is arranged to be spaced apart from the upper cooling plate by a predetermined distance to face the upper cooling plate so that a channel is formed in a space between the upper cooling plate and the lower cooling plate; and
a main frame, which comprises four unit frames with both ends being connected to each other, encompasses outer peripheral portions of the upper cooling plate and the lower cooling plate, allows an outer peripheral portion of a pouch-type secondary battery to be mounted thereon, comprises openings formed in side surfaces of two of the unit frames, each opening being in communication with the channel, and has uneven parts, corresponding to each other, respectively formed on upper and lower portions of at least two of the unit frames,
wherein the main frame comprises sealing members on the uneven parts.

10. The frame for secondary batteries of claim 9, wherein the sealing members are made of rubber material.

11. The frame for secondary batteries of claim 1, wherein a venting channel through which gas leaked from the pouch-type secondary battery flows is physically separated from the channel between the upper cooling plate and the lower cooling plate, when the frames for secondary batteries are stacked vertically.

12. The frame for secondary batteries of claim 1, wherein the main frame comprises a venting part, on the side surface of the unit frame in which no opening is formed, to open the space storing the pouch-type secondary batteries.

13. The frame for secondary batteries of claim 12, wherein the openings are formed in the left and right side surfaces of the main frame, and the venting parts are formed at the front and rear side surfaces of the main frame.

14. The frame for secondary batteries of claim 1, wherein the main frame is configured to mount one pouch-type secondary battery on an upper portion of the upper cooling plate, and another pouch-type secondary battery on a lower portion of the lower cooling plate.

15. The frame for secondary batteries of claim 1, wherein the upper cooling plate and the lower cooling plate are made of aluminum material.

16. A battery module comprising the frame for secondary batteries according to claim 1.

17. A battery pack comprising the frame for secondary batteries according to claim 1.

18. A vehicle comprising the frame for secondary batteries according to claim 1.

* * * * *